United States Patent
Chen et al.

(10) Patent No.: US 8,861,793 B1
(45) Date of Patent: Oct. 14, 2014

(54) DEPTH MAP GENERATION BASED ON VANISHING LINES AND VANISHING POINTS

(71) Applicant: Pixelworks, Inc., Portland, OR (US)

(72) Inventors: Tao Chen, Shanghai (CN); Neil D. Woodall, Newport Beach, CA (US); Bob Zhang, Santa Clara, CA (US)

(73) Assignee: Pixelworks, Inc., Portland, OR (US)

( * ) Notice: Subject to any disclaimer, the term of this patent is extended or adjusted under 35 U.S.C. 154(b) by 155 days.

(21) Appl. No.: 13/669,345

(22) Filed: Nov. 5, 2012

(51) Int. Cl.
*G06K 9/00* (2006.01)
*G06T 5/40* (2006.01)

(52) U.S. Cl.
CPC .................................... *G06T 5/40* (2013.01)
USPC ............................ 382/106; 382/154; 382/168

(58) Field of Classification Search
USPC .......................................... 382/106, 154, 168
See application file for complete search history.

(56) References Cited

U.S. PATENT DOCUMENTS

| | | | | |
|---|---|---|---|---|
| 2002/0028027 A1* | 3/2002 | Koyama | ......................... | 382/289 |
| 2010/0097455 A1* | 4/2010 | Zhang et al. | ................... | 348/119 |
| 2011/0299770 A1* | 12/2011 | Vaddadi et al. | ................ | 382/165 |
| 2012/0027290 A1* | 2/2012 | Baheti et al. | ................... | 382/154 |

OTHER PUBLICATIONS

Kong et al. ("Vanishing point detection for road detection," IEEE Proc. Conf. on CVPR, Jun. 20-25, 2009, pp. 96-103 ).*
Kim et al. ("Simultaneous line matching and epipolar geometry estimation based on the intersection context of coplanar line pairs," Pattern Recognition Letters 33 (2012), pp. 1349-1363).*
Jung et al. ("Real-time estimation of 3D scene geometry from a single image," Pattern Recognition 45 (2012), pp. 3256-3269).*
Seo et al. ("An efficient detection of vanishing points using inverted coordinates image space," Pattern Recognition Letters 27 (2006), pp. 102-108).*
Fan et al. ("A 2D-to-3D Image Conversion System Using Block Slope Pattern Based Vanishing Point Detection Technology," IEEE Int'l sym. on Computer, Consumer and Control, Jun. 4-6, 2012, pp. 321-324).*
S. Battiato, S. Curti, M. La Cascia, M. Tortora,. E. Scordato, Depth-Map Generation by Image Classification, Proceedings of SPIE, Three-Dimensional Image Capture and Application VI 5302, pp. 95-104, 2004.

* cited by examiner

*Primary Examiner* — Yubin Hung
(74) *Attorney, Agent, or Firm* — Marger Johnson & McCollom PC

(57) ABSTRACT

A method can include detecting a pixel direction and a pixel weight for each of a number of pixels in an image, generating one-dimensional (1D) and two-dimensional (2D) histograms based on the pixel directions and weights, and generating a global 2D histogram based on the generated 1D and 2D histograms. The method can also include generating a final depth map based on the global 2D histogram. The method can also include generating a block histogram statistic based on the pixel directions and pixel weights and checking the block histogram based on the block histogram statistic.

20 Claims, 8 Drawing Sheets

FIG. 1

Vanishing Lines

Intersecting Lines

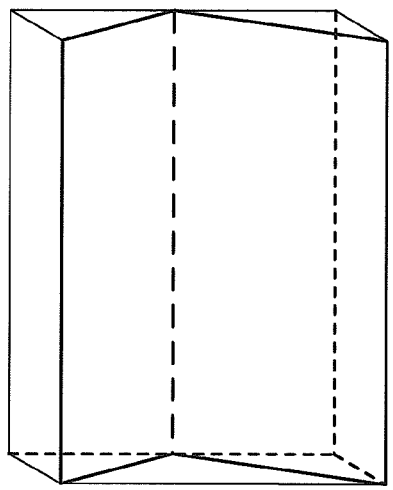
Global model 0
LR-near, center-far
FIG. 10A
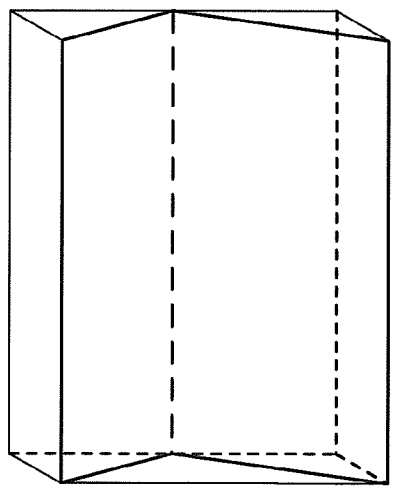 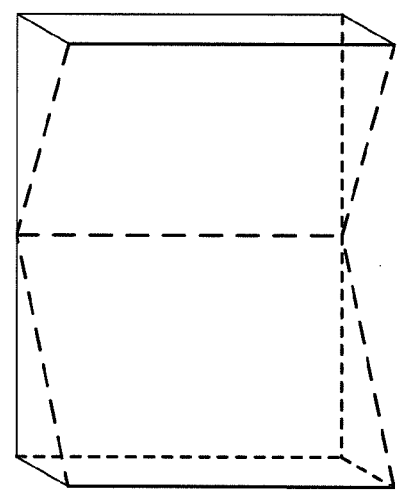
Global model 1
max (LR-near, center-far; TB-near, center-far)
FIG. 10B          FIG. 10C Global model 2
T-far, B-near Global model 3
L-near, R-far (or L-far, R-near)

DEPTH MAP GENERATION BASED ON VANISHING LINES AND VANISHING POINTS

TECHNICAL FIELD

The disclosed technology pertains to graphics processing, and more particularly to improved techniques pertaining to vanishing points and vanishing lines.

BACKGROUND

As used herein, the term vanishing point ("VP") generally refers to a point in an image or drawing to which parallel lines that are not parallel to the plane of the image, referred to herein as vanishing lines ("VLs"), appear to converge. Such vanishing points and corresponding vanishing lines typically provide depth information that can be used in two-dimensional (2D) to three-dimensional (3D) conversion.

Current techniques include the generation of a depth map based on several steps, including gradient planes generation, depth gradient assignment, and consistency verification of detected regions. Such methods, however, are generally too costly and not robust enough for efficient and effective direction detection and depth map generation.

Accordingly, there remains a need for improved graphics processing techniques with particular regard to VPs and VLs.

BRIEF DESCRIPTION OF THE DRAWINGS

FIG. 10A illustrates a first example of a global depth model in accordance with embodiments of the disclosed technology.

FIGS. 10B and 10C illustrate a second example of a global depth model in accordance with embodiments of the disclosed technology.

DETAILED DESCRIPTION

Figure 1:
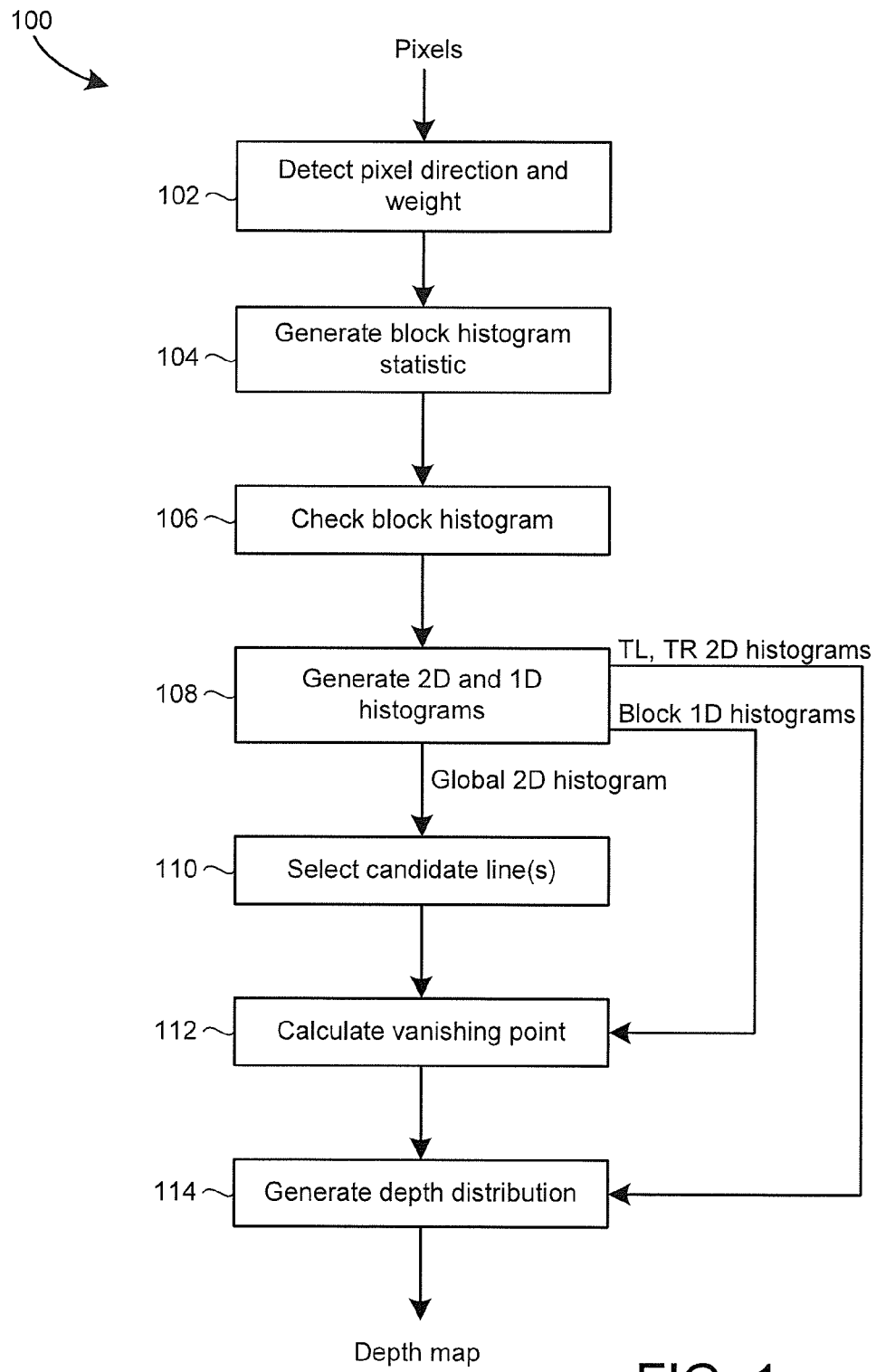
FIG. 1 illustrates an example of a method of generating a vanishing point-based depth map in accordance with embodiments of the disclosed technology.

Embodiments of the disclosed technology generally include robust and low-cost methods of generating depth maps based on vanishing lines and vanishing points. FIG. 1 illustrates an example of a method 100 of generating a vanishing point-based depth map in accordance with embodiments of the disclosed technology. A direction detection operation at 102 may first be applied to certain pixels, e.g., for an image, to determine pixel direction and weight information that may be used in generating a block histogram statistic, as indicated at 104. This block histogram may then be checked or verified, as indicated at 106.

Two-dimensional (2D) and one-dimensional (1D) histograms may then be generated, as indicated at 108. Candidate lines may be selected and at least one vanishing point may be calculated, as indicated at 110 and 112, respectively. As indicated at 114, a depth distribution may be determined based on the selected candidate lines and 2D and 1D histograms. In certain embodiments, several global depth models may be blended to generate the final depth map. In such embodiments, the blending weights of global depth models generally depend on the positions of the vanishing lines and vanishing points.

The direction detection at 102 generally avoids using ratios of vertical gradient and horizontal gradient for robustness and, instead, uses the sum of absolute difference (SAD) along the detected direction(s). By comparing the SAD of all detected directions, the direction having the minimal SAD may be selected as the edge direction and a weight may be calculated to indicate the reliability of the selected direction. This weight generally depends on the SAD difference between the selected edge direction and the direction that is perpendicular to the selected edge direction. In general, a larger difference corresponds to a larger weight.

Figure 2:
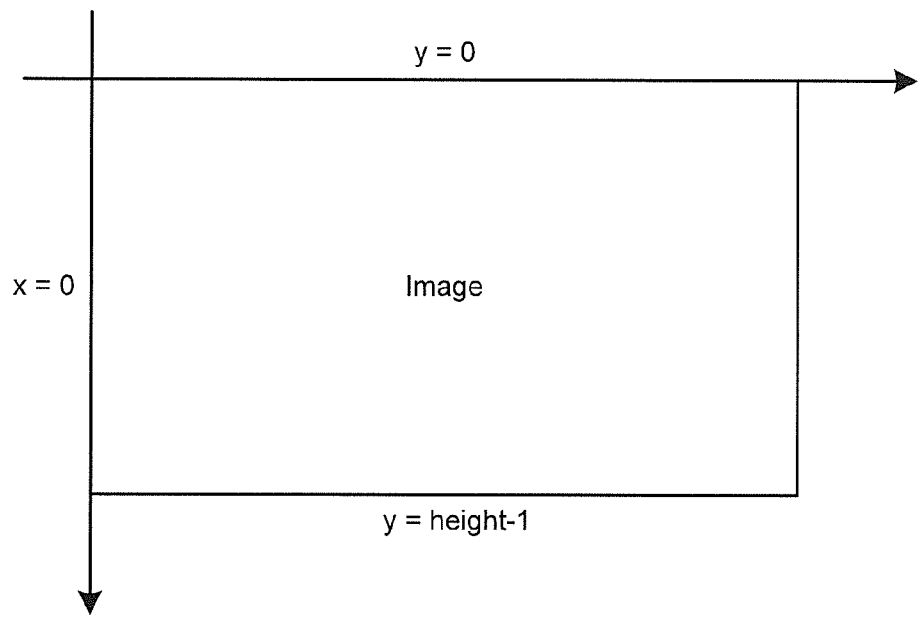
FIG. 2 illustrates an example of a pseudo-intercept in accordance with embodiments of the disclosed technology.

For each pixel, the direction and weight can be obtained, and a pseudo-intercept may be obtained based on the pixel position in the image and the pixel direction. FIG. 2 illustrates an example of a pseudo-intercept as the intersection with the line y=0 or y=height−1. Storing the pseudo-intercept with only the y axis, i.e. the line x=0, there would be a need for more intercept bins for a 1D histogram. If the pseudo-intercept with x=0 is less than zero or larger than height−1, the smallest pseudo-intercept with y=0 or y=height−1 may be selected instead. Here, the pseudo-intercept corresponds to an edge of the image. Generally, only one pseudo-intercept is calculated per pixel.

For any given pixel, the weight of direction is not necessarily accumulated directly into a 2D histogram. The image may be divided into many 8×8 blocks without overlap and a block 2D histogram may first be obtained from the weight of each pair of direction and intercept. The histogram may be checked, e.g., 106 of FIG. 1, in each block based on the neighboring block 2D histograms. After this check, the statistic value may be adjusted for each pair of direction and intercept. The adjusted block 2D histogram may be accumulated to obtain a global 2D histogram, e.g., 108 of FIG. 1. From the adjusted block 2D histogram, a block 1D 12-direction histogram may be obtained by summing the statistic values of all intercepts for each direction. This image may be divided into four regions. For two of the regions (top-left (TL) and top-right (TR)), 2D histograms may be obtained from the adjusted block 2D histogram.

From the global histogram, several candidate vanishing lines may be selected, e.g., 110 of FIG. 1. First, two intercepts having the largest accumulated direction weight may be taken for each direction. Then, weights of the two intercepts may be subtracted by summing respective neighboring weights. The intercept having the larger adjusted weight may be taken as the candidate of current direction. Twelve candidates may be obtained for a total of twelve directions. Subsequently, six pairs of direction and intercept having larger adjusted weights may be selected.

A direction and intercept pair can define a line. From two vanishing lines, a vanishing point may be calculated, e.g., 112 of FIG. 1. The reliability of the vanishing point may be calculated using the weights of the vanishing lines and the possibility of vanishing lines intersecting.

For robustness, several global depth models may be designed for several kinds of representative scenes. Based on the position of the detected vanishing lines and vanishing points in the image and their corresponding weights, the weights of multiple global depth models may be calculated. Weighted blending of multiple global depth models may be used in generating the final depth map from vanishing lines and vanishing points.

Direction Detection

Figure 3:
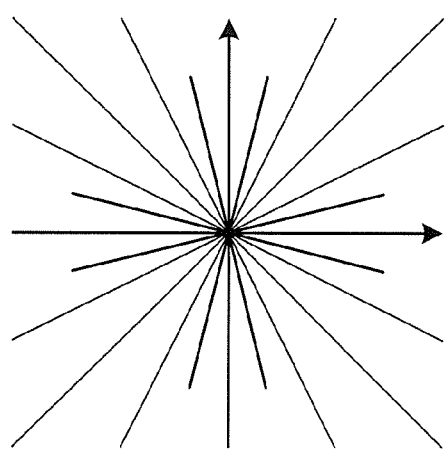
FIG. 3 illustrates an example of twelve detected directions in accordance with embodiments of the disclosed technology.

FIG. 3 illustrates an example in which the number of detected directions is twelve. For each input pixel, the direction may be obtained and its weight may be calculated using a 7×7 window surrounding the pixel. The sum of absolute difference (SAD) along each direction may first be calculated. The direction having the minimal SAD may be selected as the edge direction. By analyzing the SAD of all twelve directions, a weight may be calculated to denote the reliability of the selected direction. This direction weight mainly depends on the SAD difference between the selected edge direction and the direction perpendicular to the selected edge direction. In general, a larger difference corresponds to a larger weight.

Block Histogram Statistic

An input image may be divided into 8×8 blocks without overlap and a block 2D histogram may be obtained for each block. Each 2D histogram is generally based on direction and intercept. Based on the corresponding pixel position in the image and the detected direction, an intercept may be calculated. In each block, the weight of the direction may be accumulated on direction and intercept to generate the block 2D histogram.

Here, the intercept is not limited to the intersection with the line x=0. If only the intercept with the line x=0 were calculated, the range of the intercept would be very large and the number of intercept bins in the 2D histogram would be large. If the intercept with x=0 is less than zero or larger than height−1, the pseudo-intercept having y=0 or y=height−1 may also used. If a line is intersected with both y=0 and y=height−1 in the horizontal range, e.g., [0, width−1], the intercept with the smaller x value will typically be selected. FIG. 4 illustrates an example in which the number of the intercept bin may be obtained using the following equation:

CEIL(height/step_intercept)+2*CEIL(width/step_intercept)

where the CEIL function returns an integer that is larger than or equal to the input, step_intercept denotes the step of the intercept bin, and height and width together denote the size of the input image.

In certain embodiments, a fuzzy histogram statistic may be taken for the intercept bin for increased stability. The weight of the detected direction may be distributed into certain bins based on the distances between the current intercept to the centers of the intercept bins. The intercept bin having the smallest distance may get the largest percentage from the direction weight.

Figure 4A:
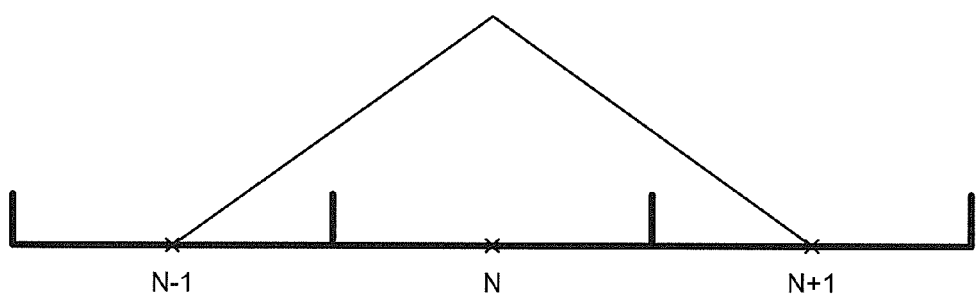
FIG. 4A illustrates a first example of a weight distribution of a fuzzy histogram in accordance with embodiments of the disclosed technology.

FIG. 4 illustrates two examples of the weight distribution to a certain intercept bin. FIG. 4A corresponds to two fuzzy bins where, when the calculated intercept is located in the range from the center of intercept bin, e.g., N−1, to the center of intercept bin, e.g., N+1, the intercept bin N has a distributed direction weight. Here, the distribution percentage is largest when the intercept is located in the center of the intercept bin N.

Figure 4B:
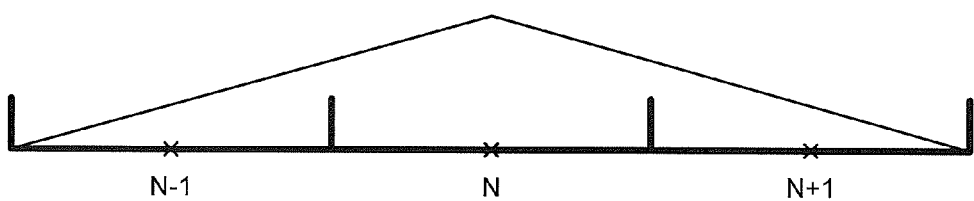
FIG. 4B illustrates a second example of a weight distribution of a fuzzy histogram in accordance with embodiments of the disclosed technology.

FIG. 4B corresponds to three fuzzy bins where, when the calculated intercept is located in the range from the left endpoint of intercept bin, e.g., N−1, to the right endpoint of the intercept bin, e.g., N+1, the intercept bin N has a distributed direction weight. For hardware implementation, the distribution ratios to two or more intercept bins may be pre-calculated and stored into a look-up-table, for example.

Figure 5:
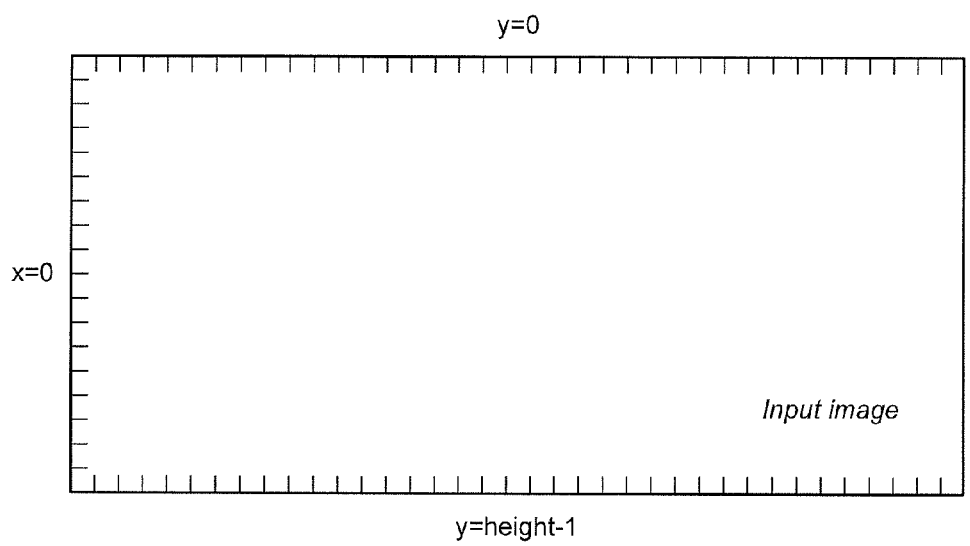
FIG. 5 illustrates an example of an intercept bin in accordance with embodiments of the disclosed technology.

In certain embodiments, the distributed direction weight may be the blending of two possible distributions of the direction weight based on the row number or the column number of the pixel in the image. Consider an example in which Fuzzy_value1 and Fuzzy_value2 denote two possible distributions that are calculated based on the distance between the calculated intercept and the center of the nearest fuzzy histogram bin. For Fuzzy_value2, the direction weight is distributed into more intercept bins. Because the impact of the quantization error on the intercept calculation increases with the distance between the block and the intercept location, the "fuzziness" of the weight histogram should reflect that. This may be accomplished by blending between two possible distributions of the weight. One distribution may be for situations where the block is close to an edge and the other for situations where it is far away. For example, when the intercept is on y=0, e.g., as illustrated by FIG. 5, the value to accumulation for an intercept bin and a certain direction may be calculated using the following equation:

(height−row)/height*fuzzy_value1+row/height*fuzzy_value2

Block Histogram Check

Figure 6:
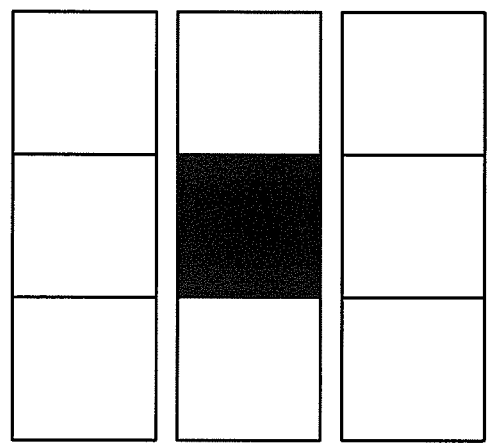
FIG. 6 illustrates an example of a local 3×3 block window in accordance with embodiments of the disclosed technology.

A block histogram check may be used to check the reliability of a block 2D histogram in a local 3×3 block window, as illustrated by FIG. 6. Certain embodiments may include a rule specifying that, where a pair of direction and intercept exists in the center block, there is a need for it to exist in the neighboring block. The following equations may be applied to perform such a histogram check:

$w\_chk(i,j)=\min(1,b\_chk+k\_chk*\max\_neib\_blkHist(i,j))$, $blkHist\_chk(i,j)=w\_chk(i,j)*blkHist(i,j)$ where i and j represent the index of direction and index of intercept bin, respectively, max_neib_blkHist denotes the maximum value of the neighboring eight histograms for the pair of direction and intercept, blkHist and blkHist_chk represent the original histogram and checked histogram respectively, and 0<=b_chk<=1 and k_chk>=0 represent certain parameters that can be adjusted to optimize the performance.

Generation of 2D and 1D Histogram

A checked block histogram generally needs further inner-block adjustment before accumulation into the final 2D and 1D histograms. A main target of the adjustment is to reduce the effect of the pixel with random direction and intercept and reduce the effect of the edge width.

If there exists a pixel having different direction and intercept in the current block, the accumulated histogram value for the direction and intercept may be decreased. This adjustment may involve use of the following formulas:

$$delta\_adj(i,j)=k\_adj*\max(0,sum\_blkHist-blkHist\_chk(i,j)-b\_adj),$$

$$blkHist\_adj(i,j)=\max(0,blkHist\_chk(i,j)-delta\_adj(i,j))$$

where i and j represent the index of direction and index of intercept bin, respectively, blkHist_chk represents the checked block 2D histogram in the above subsection, blkHist_adj represents the adjusted histogram, and b_adj>=0 and k_adj>=0 represent certain parameters.

Figure 7:
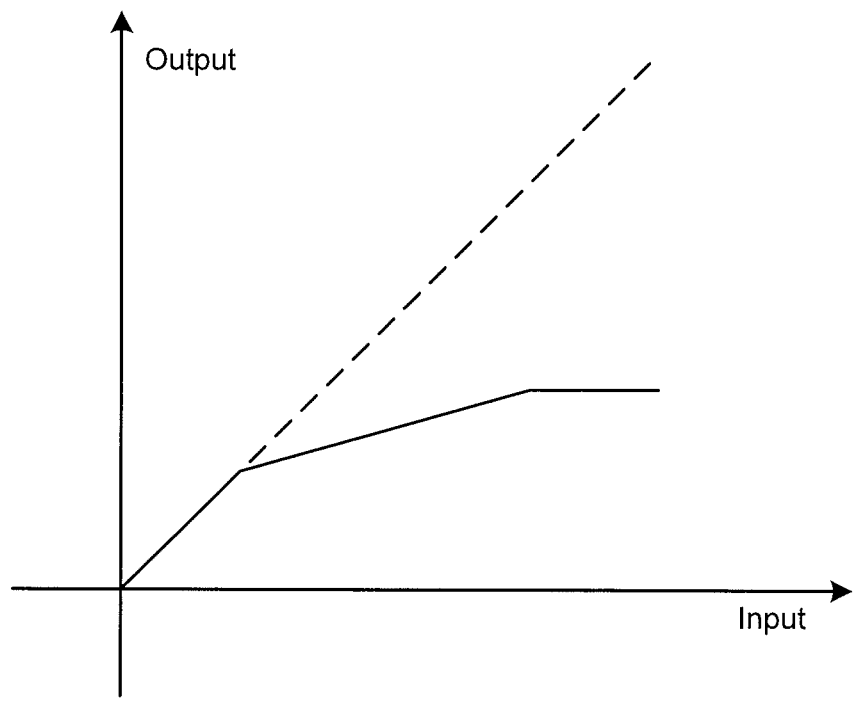
FIG. 7 illustrates an example of a histogram piece-wise linear adjustment in accordance with embodiments of the disclosed technology.

Another adjustment may be used to decrease the edge width. If the edge is wide, for example, a part of edge pixels may be accumulated into the final histograms. FIG. 7 illustrates such a piece-wise linear adjustment function.

Accumulation of the adjusted block 2D histogram may be used to generate the final global 2D histogram. Such block histogram accumulation may also operate on the image top-left (TL) region and the image top-right (TR) to obtain the TL 2D histogram and TR 2D histogram.

For each direction in the adjusted block 2D histogram, a block 1D direction histogram may accumulate the statistic values from all of the intercepts to obtain the block 1D direction histogram. The block 1D direction histogram may be used for intersecting-line removal when calculating a vanishing point, for example.

Selection of Candidate Lines

Based on the resulting global 2D histogram, several candidate vanishing lines may be selected. First, two candidate intercepts having the largest two accumulated direction weights for each direction may be chosen and the weight for each candidate may be calculated. Then, a candidate intercept having the larger adjusted weight from two candidates of each direction may be selected and four vanishing lines having larger adjusted weights may be selected from twelve candidates.

A pair of direction and intercept may define a line. Four pairs of direction and intercept generally correspond to four vanishing lines. From these vanishing lines, six vanishing points may be obtained.

The adjusted weight of a candidate intercept may be calculated such that, a larger accumulated direction weight in the histogram generally corresponds to a larger weight, and a lower value for neighboring intercepts generally corresponds to a larger weight.

Calculation of Vanishing Point

The intersection of two vanishing lines generally corresponds to a vanishing point. In certain embodiments, six vanishing points may be obtained from four vanishing lines. For each vanishing point, a weight may also be calculated. For a vanishing line i and vanishing line j, the weight of their corresponding vanishing point may be calculated using the following equations:

$$weight=\min(weight\_vl\_i,weight\_vl\_j),$$

$$weight=\max(0,weight-weight\_intersectline)$$

where weight_vl_i and weight_vl_j represent weights of vanishing lines, and weight_intersectline represents the weight of the vanishing lines being the intersecting lines.

Figure 8A:
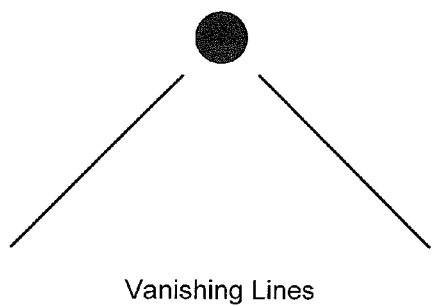
FIG. 8A illustrates an example of a visual definition of vanishing lines in accordance with embodiments of the disclosed technology.
Figure 8B:
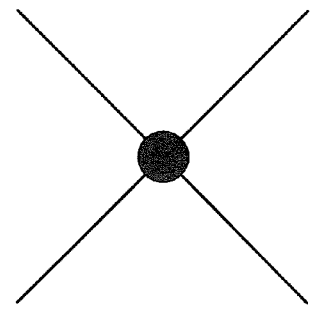
FIG. 8B illustrates an example of a visual definition of intersecting lines in accordance with embodiments of the disclosed technology.

While the vanishing lines are typically parallel in the scene, they may appear to converge in the image but they cannot have a "real" intersection. FIG. 8 illustrates an example of a visual definition of vanishing lines and intersecting lines. If two candidate vanishing lines have a real intersection, they are not "real" vanishing lines but intersecting lines. Here, the weight of vanishing lines being intersecting lines may be calculated and subtracted from the weight of vanishing points.

Figure 9A:
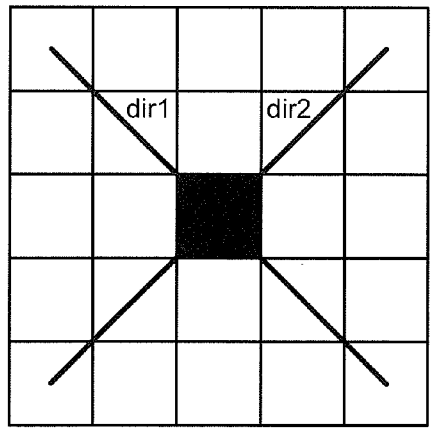
FIG. 9A illustrates an example of a local 5×5 block window in accordance with embodiments of the disclosed technology.
Figure 9B:
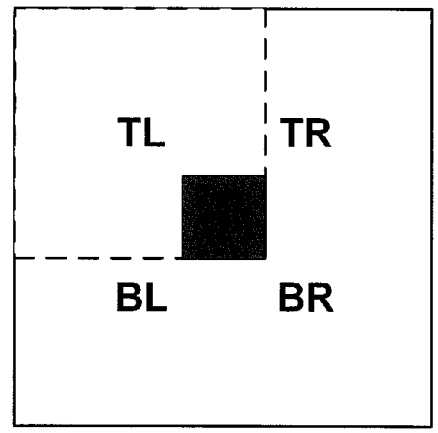
FIG. 9B illustrates an example of dividing the local 5×5 block window of FIG. 9A into TL, TR, BL, and BR local regions in accordance with embodiments of the disclosed technology.

A block 1D direction histogram may be used to decide whether the vanishing lines are the intersecting lines. From the surroundings of the vanishing point, local 5×5 block 1D direction histograms may be taken, as illustrated by FIG. 9. Allowing dir1 and dir2 to denote the direction of vanishing line1 and the direction of vanishing line2, respectively, the 5×5 block window may be divided into TL, TR, BL and BR local regions. Taking two vanishing lines in FIG. 9 as an example, line1 goes through local TL and local BR and line2 goes through local TR and local BL. For the vanishing line1, e.g., having direction dirt, the sums of the accumulated direction weights of dir1 of all block 1D direction histogram in the local region TL and in the local region BR may be calculated respectively. For the vanishing line2, the sums of dir2 in TR and in the local BL may be calculated respectively. If the vanishing line1 and the vanishing line2 are the intersecting lines in the example, both of them must satisfy the following two conditions:

the absolute difference of the sum of two local regions, e.g., local TL,BR for line1 and local TR,BL for line2, must be small; and the minimum of the sum of two local regions must large.

Allowing sum_weight0_dir1 and sum_weight1_dir1 to denote sums of direction weights in two local regions where the vanishing line1 goes through, respectively, the weight of the intersecting lines for the vanishing line1 may be calculated using the following equation:

$$weight\_intersectline1=\max(0,\min(sum\_weight0\_dir1, sum\_weight1\_dir1)-k1*abs(sum\_weight0\_dir1-sum\_weight1\_dir1))$$

where 0<k1<1 represents an adjustable parameter. Similarly, the weight of the intersecting lines for the vanishing line2 may also be calculated. Then, the weight of the vanishing lines being the intersecting lines may be obtained using the following equation:

$$weight\_intersectline=\min(weight\_intersectline1, weight\_intersectline2)$$

Depth Distribution

Figure 10D:
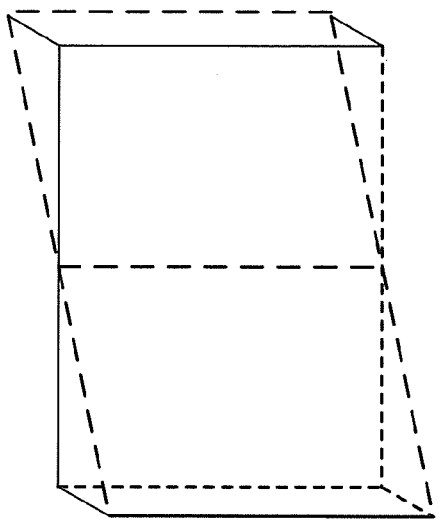
FIG. 10D illustrates a third example of a global depth model in accordance with embodiments of the disclosed technology.
Figure 10E:
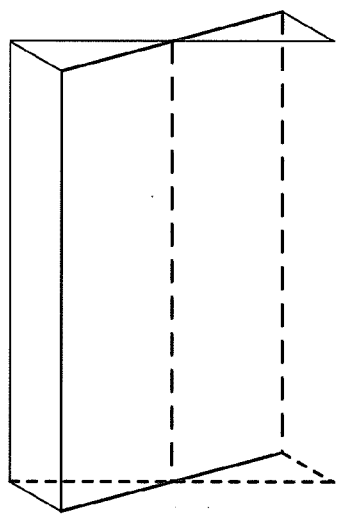
FIG. 10E illustrates a fourth example of a global depth model in accordance with embodiments of the disclosed technology.

For robustness, the resulting depth map is not necessarily generated directly from vanishing lines and vanishing points; rather, the weighted blending of multiple global depth models may be used to output the final depth map. FIG. 10 illustrates an example having four global depth models. In the example, Global model 1 represents the maximum of two depth models and may be used as an indoor depth model. The position of the detected vanishing lines and vanishing points in the image and their weights may be used to provide the weights of global depth models.

Allowing (VPx, VPy) to denote the coordinate of a vanishing point, the following may be used to introduce the rule of the global model weight for each of the four global models Global model 0: if VPx=0 or (image width−1), the weight is min. If VPx=(image width/2), the weight is max.

Global model 1: if VPy=0 or (image height−1), the weight is min. If VPy=(image height/2), the weight is max. But this model also requires that vanishing lines exist in the image top-left (TL) region and in the image top-right (TR) region and that the corresponding vanishing point is below the vanishing lines. The image TL 2D histogram and image TR 2D histogram may be used to check the requirement. For each vanishing point, there exists the vanishing line1 and the vanishing line2. dir1 and dir2 generally denote their directions with the angle of dir1<the angle of dir2, e.g., twelve directions as illustrated in FIG. 3. That the angle of dir1<the angle of dir2 will ensure that the vanishing point is below the vanishing lines. The adjusted weight of the vanishing line1 may be calculated using the image TL 2D histogram. And the adjusted weight of the vanishing line2 may be calculated using the image TR 2D histogram. The smaller of the adjusted weight in TL and the adjusted weight in TR may be taken as the measurement whether these two vanishing lines exist in the image TL region and image TR region. The max of these measurements from all pairs of vanishing lines generally represents the measurement whether there are vanishing lines in the image TL region and image TR region. The weight of the global depth model from the vanishing point will generally be limited by the measurement.

Global model2: if VPy=image height−1, the weight is min. When the VPy becomes small, the weight becomes large.

Global model3: there are two models. For the model "L-near, R-far", if VPx=(image width−1), the weight is min. When VPx becomes small, the weight becomes large. For the model "L-far, R-near", if VPx=0, the weight is min. When VPx becomes large, the weight becomes large.

The multiplication of the weight of the vanishing point and the above-calculated weight of the global model is generally the final weight of the global model from the vanishing point.

Blending the weights from all of the vanishing points will generally give the final weights of the global depth models. The weighted blending of the global depth models may be used to generate the final depth map. Allowing weight_VP[0~5] to denote the weights of six vanishing points, weight_GM[0~5][0~3] generally denotes the weights of four global models calculated from all vanishing points and weight_GM[0~3] generally denotes the blended weights of four global models.

Such calculation may rely on the following equation:

$$\text{weight\_GM}(i) = \Sigma_{j=0,\ldots,5}(\text{weight\_VP}(j)*\text{weight\_GM}(j,i))/\Sigma_{j=0,\ldots,5}\text{weight\_VP}(j), i=0,\ldots,3$$

The following discussion is intended to provide a brief, general description of a suitable machine (e.g., projector system) in which embodiments of the disclosed technology can be implemented. Typically, the machine includes a system bus to which are attached processors, memory (e.g., random access memory (RAM), read-only memory (ROM), or other state preserving medium), storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal.

The machine may include embedded controllers, such as programmable or non-programmable logic devices or arrays, Application Specific Integrated Circuits (ASICs), embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciated that network communication may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

Embodiments of the disclosed technology may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other tangible storage devices and non-transitory storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the disclosed technology with reference to described embodiments, it will be recognized that the illustrated embodiments may be modified in arrangement and detail without departing from such principles. And although the foregoing discussion has focused on particular embodiments, other configurations are contemplated. In particular, even though expressions such as "according to an embodiment of the disclosed technology" or the like are used herein, these phrases are meant to generally reference embodiment possibilities, and are not intended to limit the invention to any particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. A method, comprising:
for each of a plurality of pixels in an image, detecting a pixel direction and a pixel weight;
generating at least one one-dimensional (1D) histogram and at least one two-dimensional (2D) histogram based on the detected pixel directions and weights;
generating a global 2D histogram based on the generated 1D and 2D histograms; and
generating a final depth map based on the global 2D histogram.

2. The method of claim 1, further comprising generating a block histogram statistic based on the pixel directions and pixel weights.

3. The method of claim 2, further comprising checking the block histogram based on the block histogram statistic.

4. The method of claim 1, wherein generating the global 2D histogram comprises selecting at least one candidate line in the global 2D histogram.

5. The method of claim 4, wherein generating the global 2D histogram further comprises calculating a vanishing point based on the at least one candidate line.

6. The method of claim 1, wherein detecting the pixel direction and pixel weight comprises calculating a sum of absolute difference (SAD) for each of a plurality of directions.

7. The method of claim 6, wherein detecting the pixel direction and pixel weight further comprises selecting one of the plurality of directions having a minimum SAD as an edge direction.

8. The method of claim 2, wherein generating the block histogram statistic comprises calculating an intercept based on a position of the pixel in the image.

9. The method of claim 8, wherein generating the block histogram statistic further comprises distributing a weight of the detected direction into each of a plurality of intercept bins based on a distance between the intercept and centers of each of the plurality of intercept bins.

10. The method of claim 3, wherein checking the block histogram comprises checking a reliability of the 2D histogram in a local 3×3 block window.

11. The method of claim 1, wherein generating the at least one 1D histogram and the at least one 2D histogram comprises adjusting the block histogram based on an index of direction and an index of intercept bin.

12. The method of claim 11, wherein generating the at least one 1D histogram and the at least one 2D histogram further comprises accumulating the block histogram into the 1D and 2D histograms.

13. The method of claim 4, wherein selecting at least one candidate line comprises choosing two candidate intercepts that have the largest accumulated direction weights for each detected direction.

14. The method of claim 13, wherein selecting at least one candidate line further comprises calculating a weight for each of the candidate lines.

15. The method of claim 14, wherein selecting at least one candidate line further comprises taking a candidate intercept having a larger adjusted weight from two candidate intercepts of each detected direction.

16. The method of claim 14, wherein selecting at least one candidate line further comprises selecting four vanishing lines having larger adjusted weights from twelve candidate lines.

17. The method of claim 5, wherein calculating the vanishing point comprises obtaining six vanishing points from four vanishing lines.

18. The method of claim 17, wherein calculating the vanishing point further comprises calculating a weight for each of the six vanishing points.

19. The method of claim 1, wherein generating the final depth map comprises performing a weighted blending of the global 2D histogram and at least one other global 2D histogram into the final depth map.

20. One or more tangible, non-transitory computer-readable media storing computer-executable instructions that, when executed by a processor, perform the method recited in claim 1.

* * * * *